J. CARR.
DRILL CHUCK.
APPLICATION FILED NOV. 14, 1913.
1,125,649.
Patented Jan. 19, 1915.
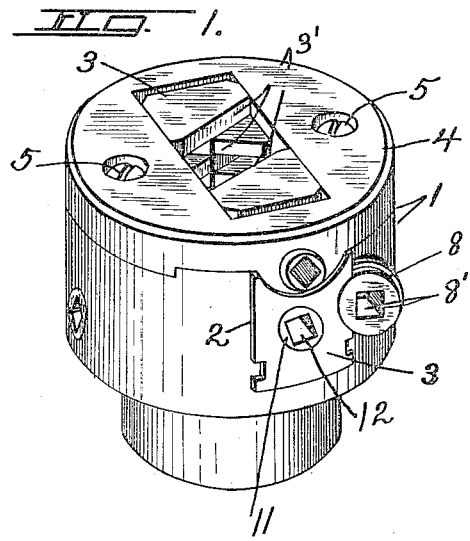
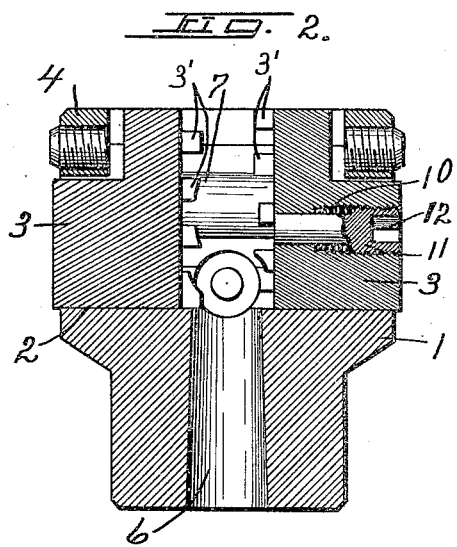
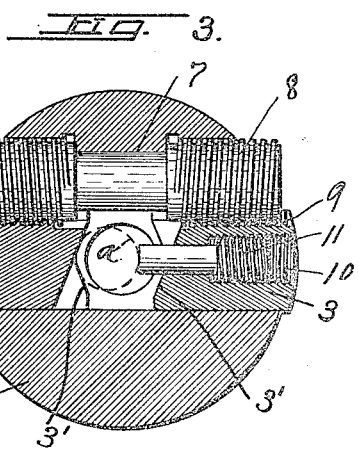
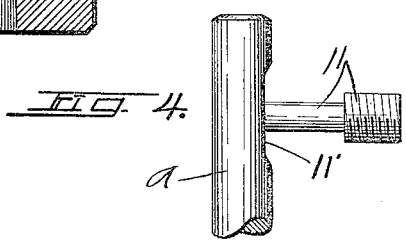
WITNESSES
INVENTOR.
James Carr
Howard P. Hutton
ATTORNEY.

UNITED STATES PATENT OFFICE.

JAMES CARR, OF SYRACUSE, NEW YORK, ASSIGNOR TO MARVIN & CASLER COMPANY, OF CANASTOTA, NEW YORK, A CORPORATION OF NEW YORK.

DRILL-CHUCK.

1,125,649.   Specification of Letters Patent.   Patented Jan. 19, 1915.

Application filed November 14, 1913. Serial No. 800,934.

*To all whom it may concern:*

Be it known that I, JAMES CARR, a citizen of the United States, residing at Syracuse, in the county of Onondaga and State of New York, have invented new and useful Improvements in Drill-Chucks, of which the following, taken in connection with the accompanying drawings, is a full, clear, and exact description.

This invention relates to certain improvements in drill chucks for centering and holding boring tools and similar implements, and refers more particularly to means on the chuck for decentering a cutting tool for use in enlarging a hole after it had been drilled in the work although it is equally useful in aiding the jaws in holding the drill or other cutting tool against turning in the chuck particularly in the use of relatively large drills or in making heavy cuts by other boring tools, reference being had to my pending application No. 830,609, filed April 9, 1914.

The main object, however, is to provide a chuck having two or more radially movable gripping jaws with a separate radially adjustable gripping member arranged in position to one or more of the other jaws according to the number employed for decentering and holding a boring or cutting tool so that the same tool may be used for boring holes of different sizes or diameters by simply adjusting the tool a greater or less degree off center by means of the separately adjustable gripping member and opposed jaw or jaws.

Another object is to enable the operator to utilize this separately adjustable member in connection with the centering jaws for additionally gripping and holding the tool in the chuck.

Other objects and uses will be brought out in the following description.

In the drawings—Figure 1 is a perspective view of a lathe or boring machine chuck embodying my invention. Figs. 2 and 3 are respectively a longitudinal sectional view of a chuck diametrically through the center of the jaws and a transverse sectional view through the same chuck in the plane of the jaws and their adjusting screws. Fig. 4 is a side elevation of a boring tool and the adjustable decentering screw shown as engaged with a flattened portion of the tool to aid the jaws in holding said tool against turning in the chuck and also for decentering the tool.

In illustrating the use of my invention, I have shown a cylindrical jaw supporting head —1— as provided with a diametrical groove or recess —2— for receiving and guiding a pair of opposed radially movable jaws —3—, said head being provided with a removable cap —4— normally held in place by screws —5— or equivalent fastening means whereby the jaws may be placed in operative position or removed from the head at will by simply removing the cap. The base or main body of the head is provided with the usual tapered bore —6— for receiving the correspondingly tapered portion of a rotary driving spindle (not shown) but upon which these chucks are usually mounted with a friction fit. The jaws —3— are provided with suitable gripping faces —3'— for gripping and centering a tool in the head and are adapted to be adjusted radially and simultaneously by means of a screw spindle —7— which is journaled in the main body of the head at one side of the jaws and is provided with threaded ends —8— of opposite pitch for engagement with correspondingly threaded segments —9— in the adjacent faces of the jaws so that when the spindle —7— is rotated, the same degree of radial motion will be imparted to each of the jaws —3—.

The particular feature of my invention consists in providing at least one of the jaws with a radial bore —10— having its outer end enlarged and threaded and its inner end reduced for receiving a separate gripping member consisting of a screw spindle —11— having its outer end enlarged and engaged in the threaded portion of the opening —10— and its inner end reduced and guided in the reduced end of said bore so that by rotating the screw, it will be moved radially in one direction or the other according to the direction of rotation, the outer end of said screw being provided with an angular socket —12— for receiving a suitable tool by which the screw —11— may be turned. The threaded end of the bore —10— is of sufficient length to permit the inner end of the screw spindle —11— to be adjusted some distance beyond the inner gripping face of the jaw —3— in which the set screw is mounted to coact with the gripping face of the opposite jaw in holding the tool as —*a*— shown by dotted lines in Fig. 3 off center for boring holes of different sizes with the same tool or for enlarging a hole previously bored by a drill.

One end of the screw spindle —7— is provided with an angular socket —8'— for receiving a similarly formed wrench by which the spindle may be turned to adjust the jaws radially toward and from each other in the act of gripping or releasing the tool, it being understood that the jaws are set or adjusted so that their gripping faces are equidistant at opposite sides of the center or axis of the head while the right and left hand threads on opposite ends of the screw-spindle engaging with the corresponding threaded segments —9— on the adjacent faces of the jaws serve to simultaneously move said jaws equal distances in opposite directions. The length of the separate tool-gripping screw —11— from end to end is approximately equal to or slightly less than the distance between the periphery and gripping face of the jaw in which said screw is mounted so as to allow its inner ends to be adjusted outwardly beyond the gripping face of the jaw without causing its outer end to protrude beyond the periphery of the jaw.

When it is desired to support a tool as —a— off center for the purpose of enlarging a previously drilled hole, it is simply necessary to open the jaws —3— by means of the screw spindle —7— and then to adjust tool-gripping screw —11— inwardly until its inner end protrudes the desired distance between the gripping face of the jaw in which it is mounted whereupon the tool may be inserted between the inner end of the gripping screw and gripping face of the opposed jaw and both jaws operated by means of the screw spindle —7— until the tool is firmly clamped between the gripping screw and opposed jaw as shown by dotted lines in Fig. 3.

In some instances, the tool-gripping screw —11— may engage a flattened portion —11'— on one side of the tool as —a— or a drill spindle in holding the same coaxial with the head or off center therein. This is particularly advantageous in the use of large drills in boring through hardened metal to reduce the strain on the gripping jaws and further prevent turning of the tool in the chuck.

I have shown my invention as applied to a standard type of chuck having a pair of opposed radially movable jaws operated by right and left hand screws of the same pitch secured to the same spindle but it is evident that the separate tool-gripping screw or its equivalent may be used in connection with any kind of a radially movable jaw without departing from the spirit of my invention as defined by the appended claims.

What I claim is:

1. A chuck having centering jaws, one of which is provided with a threaded opening, and a decentering screw adjustable in said opening beyond the gripping face of such jaw.

2. In a drill chuck, a head, centering jaws on the head, means for adjusting said jaws, and a decentering screw centrally in one of the jaws and adjustable beyond its gripping face.

In witness whereof I have hereunto set my hand this 12th day of November, 1913.

JAMES CARR.

Witnesses:
H. E. CHASE,
EVA E. GREENLEAF.

Copies of this patent may be obtained for five cents each, by addressing the "Commissioner of Patents, Washington, D. C."